(No Model.)

P. HOOGERZEIL.
STOVE OVEN.

No. 467,292.  Patented Jan. 19, 1892.

Witnesses:
Alice A. Perkins
Joseph F. Hawkins

Inventor:
Peter Hoogerzeil
by Alvan Andrew, his atty

UNITED STATES PATENT OFFICE.

PETER HOOGERZEIL, OF BEVERLY, MASSACHUSETTS.

STOVE-OVEN.

SPECIFICATION forming part of Letters Patent No. 467,292, dated January 19, 1892.

Application filed November 25, 1891. Serial No. 413,096. (No model.)

*To all whom it may concern:*

Be it known that I, PETER HOOGERZEIL, a citizen of the United States, and a resident of Beverly, in the county of Essex and State of Massachusetts, have invented new and useful Improvements in Stove-Ovens, of which the following, taken in connection with the accompanying drawings, is a specification.

This invention relates to improvements in stove-ovens of the kind in which the oven-door is connected to a plate or grating, so as to cause the latter to be automatically drawn out when the door is swung open and pushed in during the closing of said door; and this my present invention relates particularly to improvements on the United States Letters Patent granted jointly to myself and George F. Hinkley January 7, 1890, No. 418,721, for stove-ovens, and it is carried out as follows, reference being had to the accompanying drawings, wherein—

Figure 1:
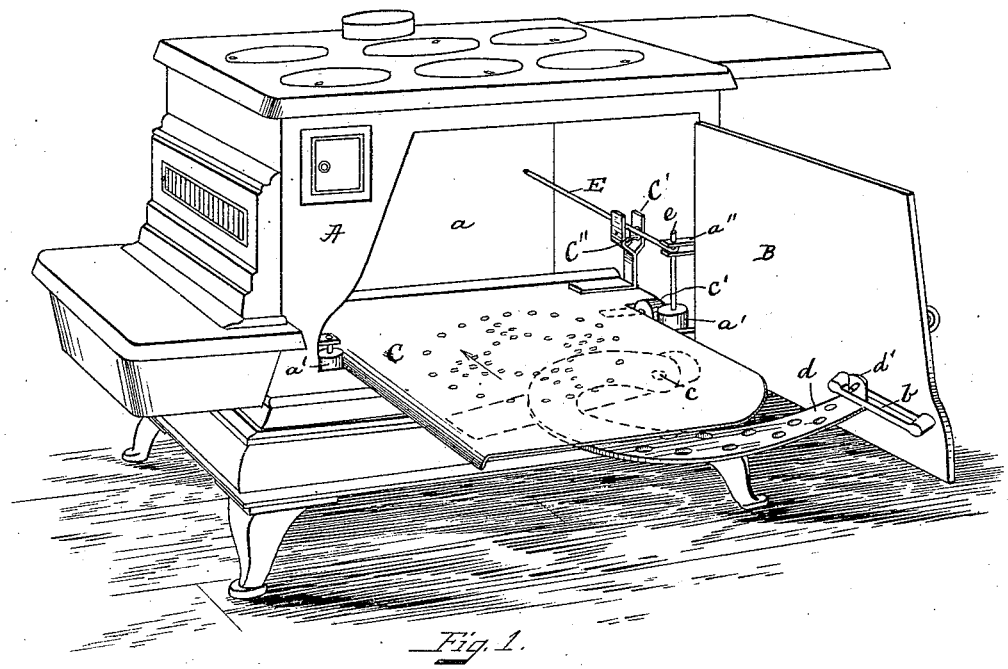
Figures 2, 3:
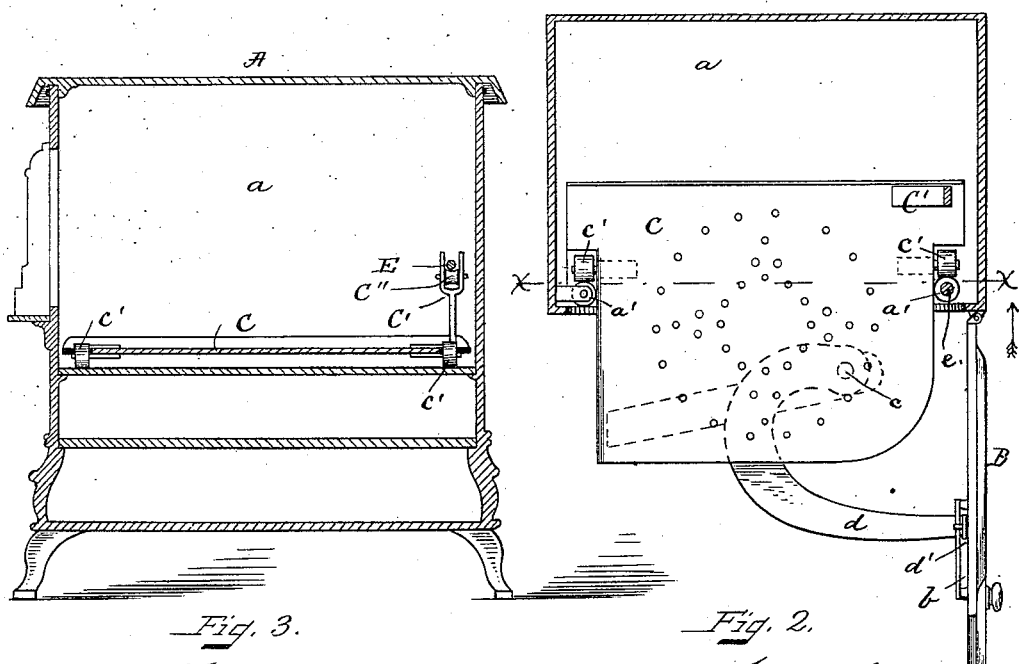

Figure 1 represents a perspective view of a stove provided with my improvement. Fig. 2 represents a horizontal section of the stove-oven, and Fig. 3 represents a cross-section on the line X X, shown in Fig. 2.

Similar letters refer to similar parts wherever they occur on the different parts of the drawings.

In the patent aforesaid rollers mounted on adjustable bearings secured to the grating are shown, said rollers being adapted to bear against the insides of the oven and served as means for guiding the grate while being moved in and out. In practice, however, it was found that the grate when heated expanded sufficiently to cause said rollers to bind and press too hard against the insides of the oven, by which a free-and-easy motion of the grate was prevented.

The object of my present invention is to obviate such difficulty and to so guide the grate that its movement shall not in any manner be impeded or obstructed by the expansion caused by the heat of the oven.

In the drawings, A represents a stove, and $a$ is the oven therein, as usual.

B is the oven-door, hinged to one side of the oven, as usual.

C represents the movable grating, having pivoted to it at $c$ the curved link or bar $d$, the outer end of which is loosely connected in a detachable manner to the inside of the oven-door, preferably by means of a lip or projection $d'$ on the bar $d$, inserted in a slotted ear $b$ on the inside of the oven-door B, as shown in Figs. 1 and 2. The grating C is supported on rollers $c'$ $c'$, which are adapted to roll on the bottom of the oven as the grating is moved in and out.

$a'$ $a'$ are anti-friction rollers journaled on stationary pins secured to the oven in any desired manner, between which rollers the grate is guided during its in-and-out motion. Such rollers, however, are sufficiently far apart to prevent obstruction to the free movement of the grate in case the latter should become expanded by the heat of the oven.

The above construction is substantially like that shown and described in the above-mentioned patent, and I do not claim such as my present invention.

The improved arrangement for guiding the grate as it is being moved in and out is constructed as follows: Above the grate is secured within the oven at one of its sides a horizontal rod E, the rear end of which is preferably inserted in a perforation in the rear wall of the stove or oven and having its forward end preferably connected in a detachable manner by means of a pin $e$, going through a perforation in the forward end of said rod E, and a perforation in an ear $a''$, secured to or forming a part of the forward end of one of the side walls of the oven. In connection with such guide-rod I use a grooved or forked bracket C', secured to the edge of the grate C below the guide-rod E, which bracket embraces the said guide-rod and is provided with an anti-friction roller C'', adapted to roll against the under side of said rod during the forward-and-back motion of the grate. By having the grate thus guided at one of its sides only by the mechanism described there is no danger of the binding or sticking of the grate, caused by being expanded by the heat of the oven. Besides being practical in its operation at all times, it is very simple in construction and can be applied to stoves of any construction with ease and at very slight expense.

Having thus fully described the nature, construction, and operation of my invention, I wish to secure by Letters Patent and claim—

1. The oven or box $a$ and its hinged door B and the movable grating C, connected to said door, as described, combined with the guide-rod E in the oven and a forked or grooved bracket or projection C' on the grating, substantially as and for the purpose set forth.

2. The oven or box $a$ and its hinged door B and the movable grating C, connected to said door, as described, combined with the guide-rod E in the oven and a forked or grooved bracket or projection $c'$ on the grating, said bracket having an anti-friction roller, substantially as and for the purpose set forth.

3. The oven or box $a$ and its hinged door B and the movable grating C, connected to said door, as described, combined with the guide-rod E in the oven, a forked or grooved bracket or projection C' on the said grating, grate-supporting rollers $c'\ c'$, and guide-rollers $a'\ a'$ in the oven, substantially as and for the purpose set forth.

In testimony whereof I have signed my name to this specification, in the presence of two subscribing witnesses, on this 23d day of November, A. D. 1891.

PETER HOOGERZEIL.

Witnesses:
ALBAN ANDRÉN,
THEKLA ANDRÉN.